Dec. 7, 1943.   J. TROTTA   2,336,426
MAGNETO ELECTRIC SHOCKING MACHINE
Filed March 9, 1942   5 Sheets-Sheet 1
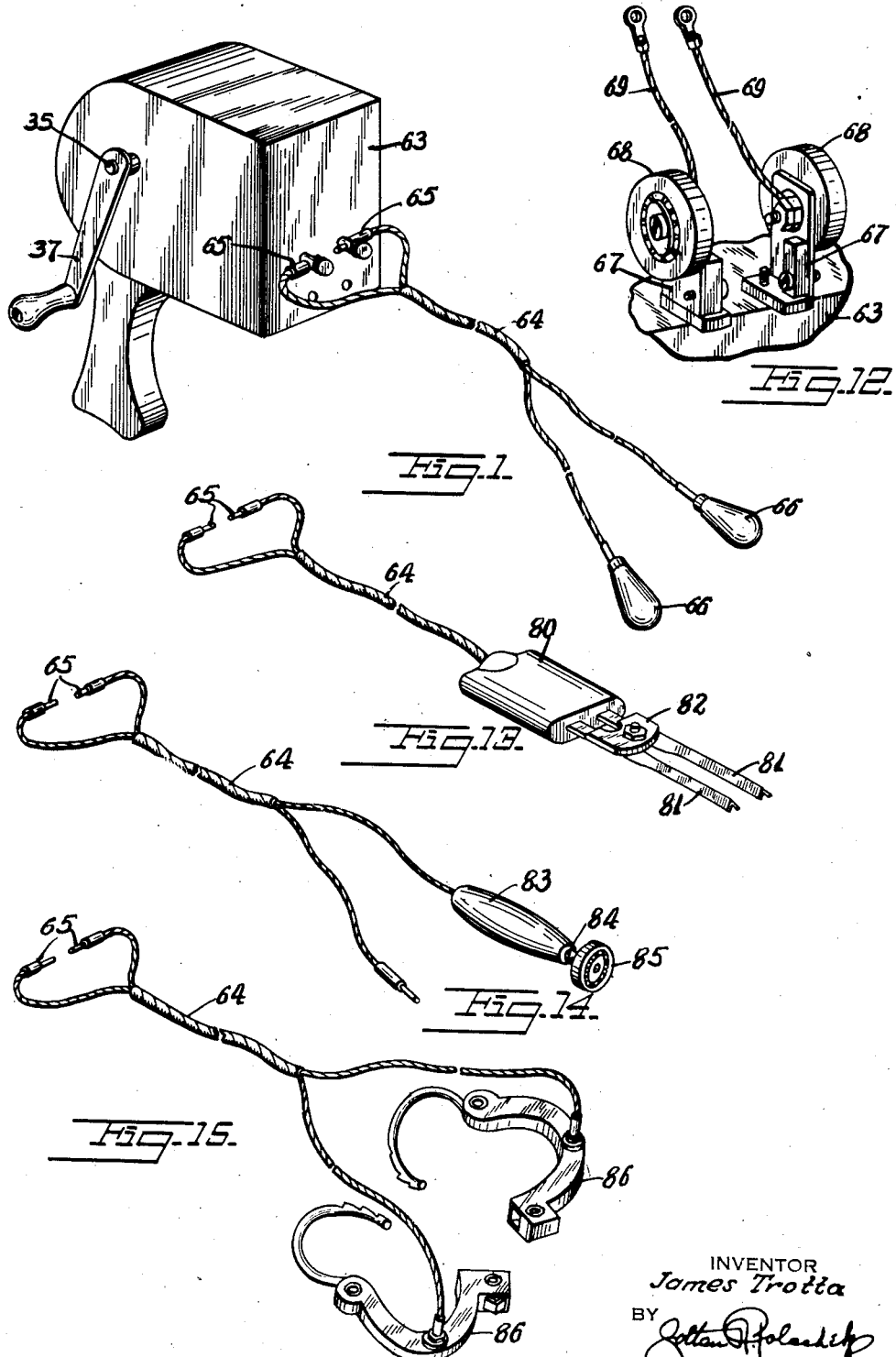
INVENTOR
James Trotta
BY
ATTORNEY

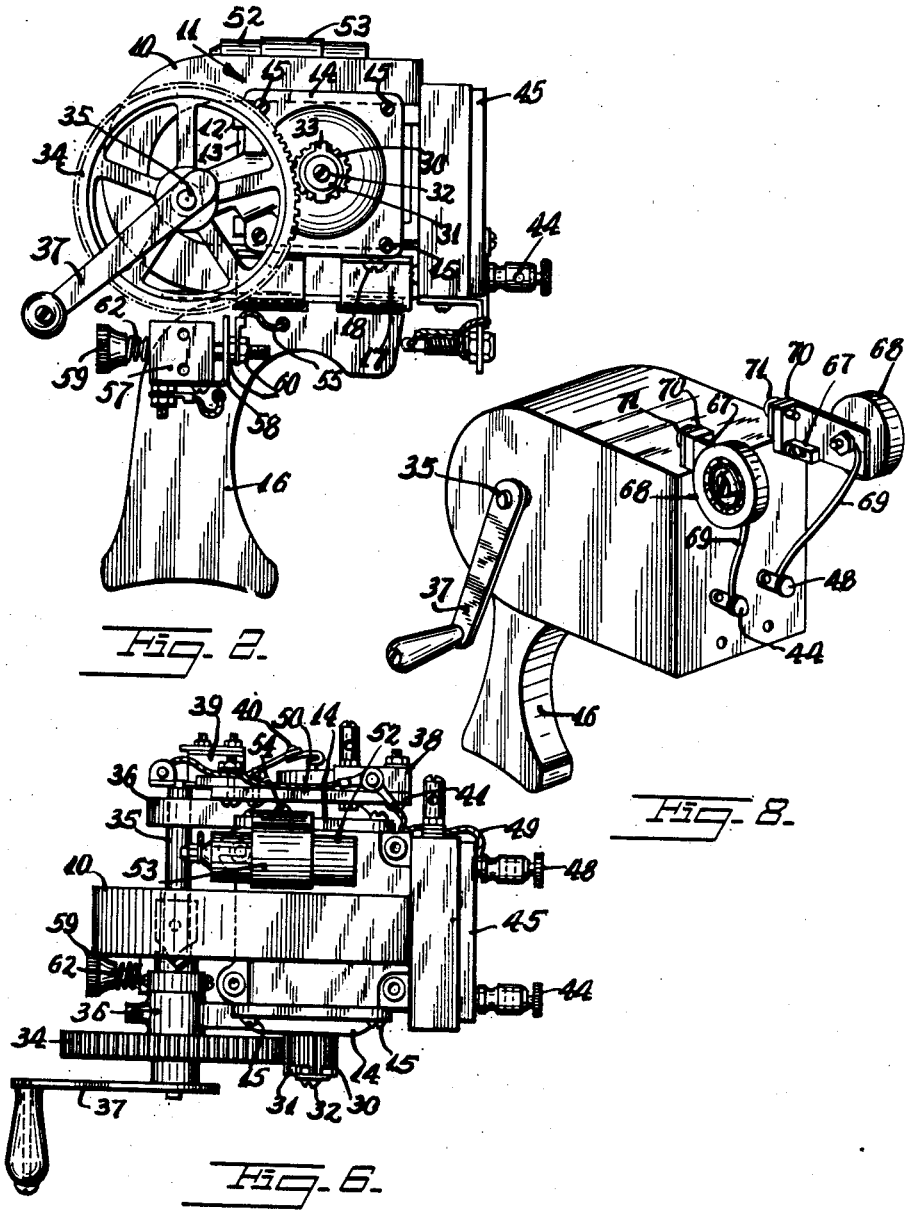

Dec. 7, 1943.   J. TROTTA   2,336,426
MAGNETO ELECTRIC SHOCKING MACHINE
Filed March 9, 1942   5 Sheets-Sheet 3

INVENTOR
James Trotta
BY
ATTORNEY

Dec. 7, 1943.   J. TROTTA   2,336,426
MAGNETO ELECTRIC SHOCKING MACHINE
Filed March 9, 1942   5 Sheets-Sheet 4

INVENTOR
James Trotta
BY
ATTORNEY

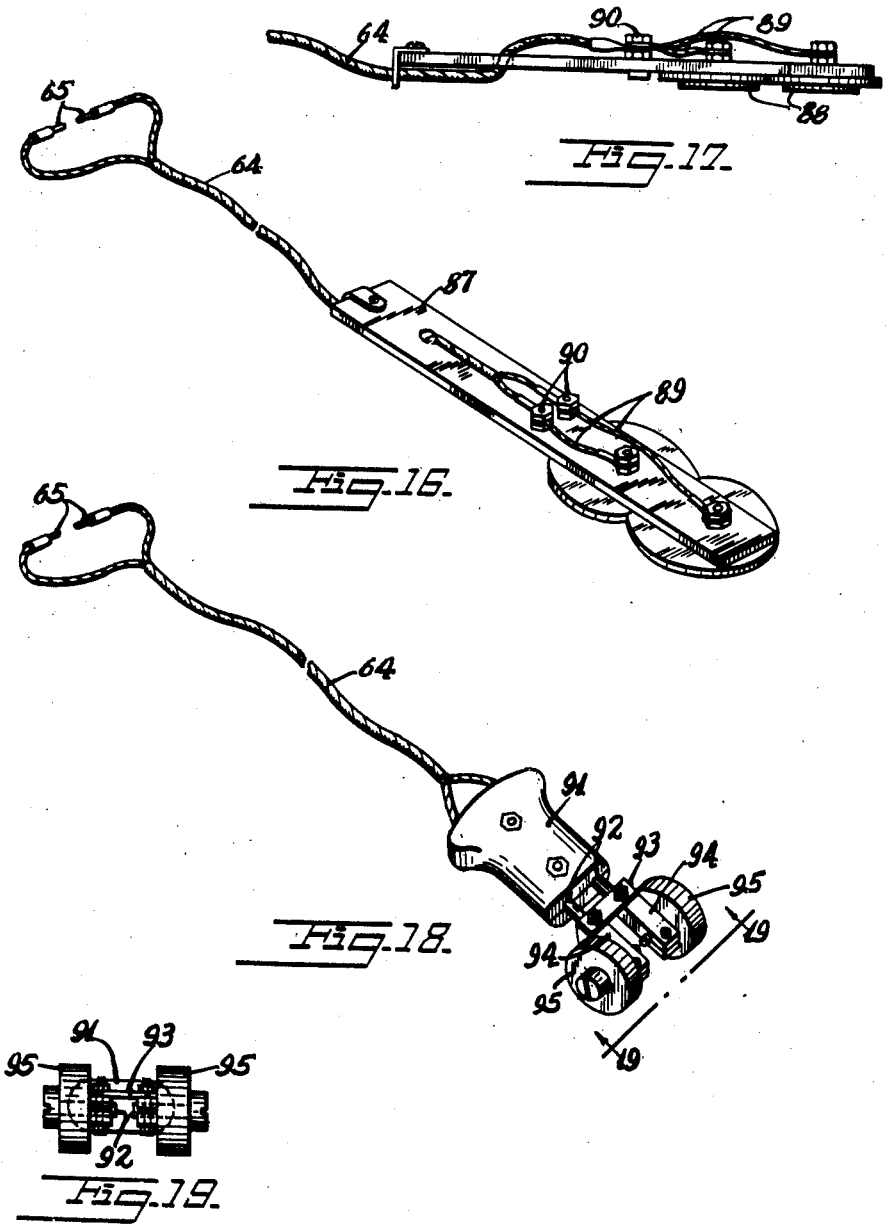

Patented Dec. 7, 1943

2,336,426

UNITED STATES PATENT OFFICE 2,336,426

MAGNETOELECTRIC SHOCKING MACHINE

James Trotta, New York, N. Y.

Application March 9, 1942, Serial No. 433,947

3 Claims. (Cl. 128—406)

This invention relates to new and useful improvements in a magnetoelectric shocking machine.

More specifically, the invention proposes the construction of a magnetoelectric shocking machine characterized by a horse shoe magnet having an armature housing disposed between its arms and enclosing a turnable armature connected in a novel manner with a pair of terminals in a manner to cause an electric current to be set up and discharged through said terminals as said armature is turned resulting in a shocking machine useful for amusement purposes or for treating human illnesses.

A further object of the invention proposes a novel means for connecting the winding of the armature in a circuit including the pair of terminals in a manner to cause the circuit through the armature to be completed.

A further object of the invention proposes a manually operable switch control condenser circuit arranged in a novel manner to be normally in the circuit including the terminals to restrain the shocking quality of the machine.

It is a further object of the invention to provide a switch in the condenser circuit and arranged in a manner to be conveniently opened to take the condenser out of the circuit to permit the full electrical discharge of the rotating armature to be transmitted to the terminals.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a magnetoelectric shocking machine constructed in accordance with this invention.

Fig. 2 is a side elevational view of the shocking machine with the housing removed.

Fig. 6 is a plan view of Fig. 2.

Fig. 8 is a view similar to Fig. 1 but illustrating a modification of the invention.

Fig. 12 is a view similar to a portion of Fig. 8 illustrating an adjusted position of the parts.

Fig. 13 is a perspective view of one of the attachments for the electric shocking machine.

Fig. 14 is a perspective view of another attachment.

Fig. 15 is a perspective view of still another attachment.

Fig. 16 is a perspective view of still another type of attachment.

Fig. 17 is a side elevational view of a portion of Fig. 16.

Fig. 18 is a perspective view of a still further attachment.

Fig. 19 is a view looking in the direction of the line 19—19 of Fig. 18.

Figures 4, 5:
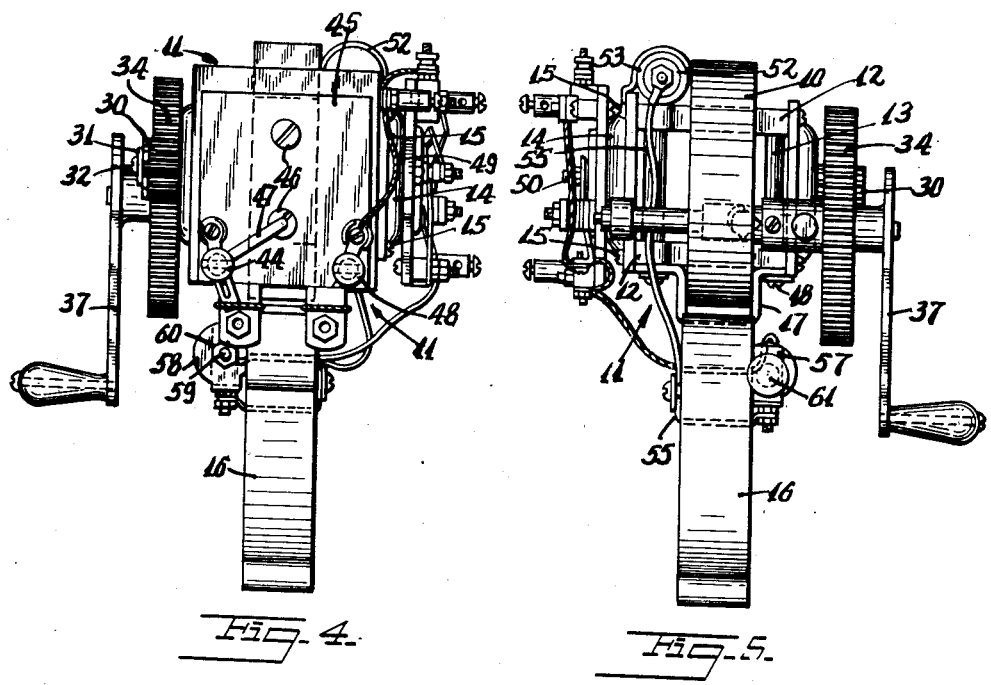
Fig. 4 is an elevational view of Fig. 2 looking from the right hand side.
Fig. 5 is an elevational view of Fig. 2 looking from the left hand side.

The magnetoelectric shocking machine, according to this invention, comprises a horse shoe magnet 10 having its arms disposed horizontally. An armature housing 11 is mounted between the arms of the magnet 10. The armature housing 11 preferably comprises spaced top and bottom plates 12 connected together by means of vertical spindles 13 and having end plates 14 mounted thereon and secured in position by means of screws 15. A handle 16 is mounted in position with relation to the bottom arm of the horse shoe magnet 10. The handle 16 is preferably of a pistol grip type and is constructed of wood or other non-conducting material. The handle 16 is securely attached to a pair of adjacent substantially U-shaped members 17 which are secured to the bottom plate 12 of the armature housing 11 by means of screws 18. The U-shaped members 17, as shown in Fig. 5, extend around the bottom arm of the magnet 10.

Figure 7:
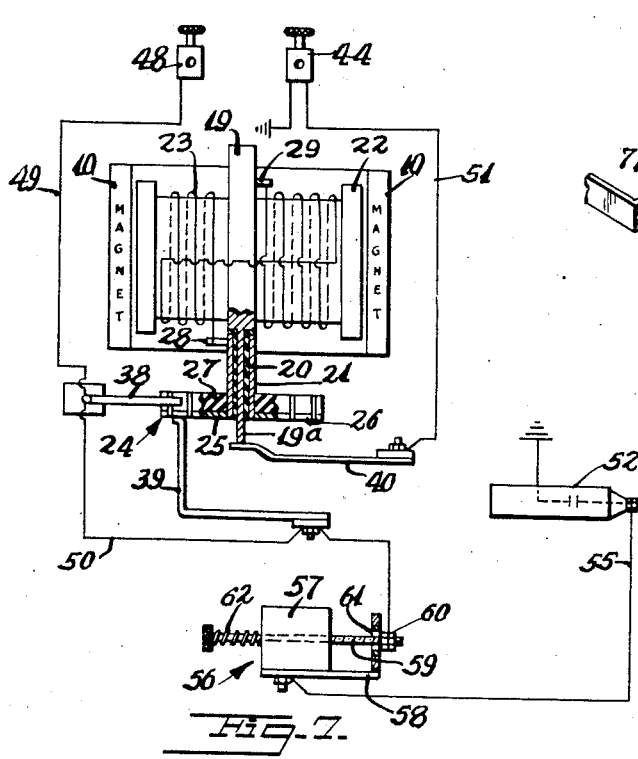
Fig. 7 is a schematic wiring diagram of the machine.

An armature is rotatively mounted within the armature housing 11. The armature comprises a shaft 19 having its ends extend through the end walls 14 of the housing 11. The shaft 19 has a reduced end 19a provided with an insulation cover 20 and over which a sleeve 21 of metallic material is engaged. As shown in Fig. 7 the reduced end 19a is projected beyond the insulation material 20 and sleeve 21 for a purpose which will be hereinafter described. The shaft 19 is provided with the usual radial arms 22 which are disposed within the armature housing and upon which a winding 23 is wound in the usual manner. A metal disc 24 is mounted upon the projected end of the sleeve 21. This metal disc includes a metal core 25 engaging the sleeve 21 and provided with a plurality of radial extensions 26 which are connected together to form an integral unit by means of insulation material 27 integrally molded therewith. The disc 24 is preferably threadedly engaged on the end of the sleeve 21.

It is noted that one end of the winding 23 of the armature is connected with a pin 28 mounted upon the sleeve 21 for connecting the winding 23 with the disc 24. The other end of the winding is connected with a pin 29 mounted upon the shaft 19 and arranged in a manner to ground this end of the winding, as will be hereinafter described.

A manually operable gear speed up transmission is provided for permitting the armature to be conveniently turned. This means comprises a small gear 30 mounted upon the enlarged end of the shaft 19. The gear 30 is held in position by means of a washer element 31 which is locked to the shaft 19 by means of a screw 32 and which is provided with a pair of radial ribs 33 engaging complementary cutouts formed in the adjacent end of the small gear 30. The small gear 30 meshes with a comparatively larger gear 34 mounted upon a shaft 35. The shaft 35 is rotatively supported in a pair of brackets 36 extending from the end walls 14 of the armature housing 11. One end of the shaft 35 carries a handle 37 which is adapted to be rotated for rotating the shaft 35 and in turn rotate the large gear 34 to rotate the small gear a number of complete revolutions for each revolution of the large gear 34. Since the small gear 30 is attached to the armature is similarly rotates this armature and causes an electric current to be set up within the machine.

Figure 3:
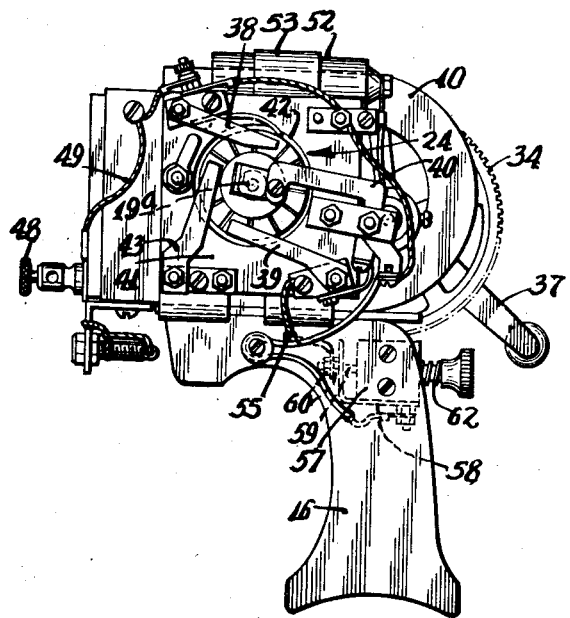
Fig. 3 is a rear elevational view of Fig. 2.

A pair of leaf spring elements 38 and 39 contact the separated sections 26 of the disc 24. Two leaf springs 38 and 39 are used to insure a completion of the circuit in all of the rotative positions of the disc 24. A leaf spring member 40 also contacts the reduced end of the shaft 19 of the armature. These leaf springs 38, 39 and 40 are mounted upon an insulation member 41 mounted upon one of the end walls 14 of the armature housing 11. The insulation member 41 is provided with an enlarged opening 42 which encircles the disc 24 (see Fig. 3).

A leaf spring 43 is mounted on the insulation member 41 and has its end bent to engage the grooves in the face of the disc 24 between the adjacent sections 26 for limiting and holding the armature to be turned in one direction only. The relationship between the spring 43 and the disc 24 is such that when the armature is turned in one direction the end of the leaf spring 43 readily jumps over the grooves, but when turned in the other direction the end of the leaf spring engages one of the grooves and prevents the disc from turning.

A ground terminal 44 is provided and is mounted upon an insulation member 45 securely attached to the armature housing 11 by means of screws 46. The screws 46 by virtue of their connection with the armature housing 11, are grounded and a spring element 47 extends from the ground terminal 44 and contacts one of the screws 46 for grounding this terminal. A high tension terminal 48 is mounted upon the insulation member 45 at a point adjacent to the ground terminal 44. The high tension terminal is connected by means of an electric lead 49 with the leaf spring contact 38. A second lead 50 connects the leaf spring contact 38 with the leaf spring contact 39 and a lead 51 connects the ground terminal 44 with the leaf spring contact 40.

A manually operative switch controlled condenser circuit extends from one of the leaf springs to the ground terminal 44. This circuit comprises a condenser 52 having one terminal grounded by virtue of its being attached to a bracket 53 in turn secured to the armature housing 11 by means of a screw 54. A lead 55 connects the other end of the condenser 52 with the spring contact 39. A switch 56 is mounted in the condenser circuit and includes a body of non-magnetic material 57 mounted upon the side of the handle 16. An L-shaped contact 58 is mounted upon the bottom of the insulation body 57 and has one of its arms extended upwards along one side of the insulation body.

The disc 24 is segmented to include metallic and non-metallic areas to control the charging and discharging of the condenser 52 for producing a surge of potential at the terminals 44 and 48 as the contacts 38 and 39 move across the metallic and non-metallic areas of the disc 24.

A bolt 59 is slidably extended through the insulation body 57 and is provided at its outer end with a pair of adjacent nuts 60 after having been passed through an enlarged opening 61 formed in the L-shaped contact 58. A spring 62 is coaxially mounted upon a portion of the bolt 59 and operates between the head of the bolt 59 and an adjacent side of the insulation body 57 for urging the bolt 59 into a position in which the nuts 60 contact the L-shaped contact 58. It will be noted that the ends of the lead 55 are connected to the nuts 60 and the L-shaped contact 58. The switch 56 is so positioned upon the handle 16 that the thumb of the hand engaging the handle may be used to press inwards upon the bolt 59 and disengage the nut 60 from the L-shaped contact 58. Since the opening 61 in the L-shaped contact 58 is of a diameter substantially greater than the bolt 59 the circuit through this portion will be broken in the pushed in position of the bolt 59.

As shown in Fig. 1 there is a casing 63 enclosing the entire shocking machine with the exception of the handle 16, the terminals 44 and 48, and the handle 37 which is to be used for rotating the armature. An electric wire 64 is provided at one pair of its ends with metal end members 65 engageable with the terminals 44 and 48. The other end of the electric wire 64 is provided with hand grips 66. These hand grips are releasably engaged on the ends of the wire 64 for a purpose as will be hereinafter described. The hand grips 66 are preferably constructed of conducting material and each is to be individually gripped while the handle 37 is being turned for conveying the electric current from the shocking machine to enter the body through the hands.

The operation of this form of the invention is as follows:

The electric wire 64 has its metallic end members 65 connected to the terminals 44 and 48. The hand grips 66 are individually gripped by one person. A second person grips the handle 16 and rotates the handle 37 to turn the gear 34 which in turn rotates the gear 30 and the armature. This causes an electric current to be set up by the machine which will pass through the wire 64 and out through the metallic grips 66 to enter the body of a person. In the event the person holding the grips 66 becomes accustomed to the amount of current set up with the condenser 52 in the circuit, it is possible to increase the shocking quality by pressing inwards upon the bolt 59 to open the circuit 55 and take the condenser 52 out of the circuit, causing the entire shocking quality of the machine to pass outwards through the metallic grips 66.

According to the modification of the invention shown in Figs. 8–11 the constructing of the shocking machine is similar to that previously described, except for the provision of a means for simultaneously massaging a portion of the body while causing an electric current to pass therethrough. In this form of the invention a pair of adjacent metallic members 67 carry rotatively supported metallic wheels 68 each of which is individually connected by means of a wire 69 with either the ground terminal 44 or the high tension terminal 48. The metallic members 67 are mounted upon vertical rods 70 by means of screws 71. The rods 70 pass into the casing 63 and through brackets 72 mounted upon the inside of the housing 63. An L-shaped lever 73 has one of its arms pivotally attached to a bracket 74 extending from one wall of the casing 63 by means of a screw 75. The free end of one arm of the L-shaped bracket 73 is adapted to be contacted by means of a pair of enlarged radial ribs 33' extending from the member 31 used for locking the small gear 30 to the armature shaft 19.

The other arm of the L-shaped member 73 is connected to the bottom ends of the rods 70. This arm is provided with a pair of projecting pins 76 which engage in elongated slots 77 formed in the bottom end of the rods 70. A spring 78 has one end attached to an intermediate portion of the arm of the L-shaped member 73 which carries the pin 76. The free end of the spring 78 is attached to a stud 79 projecting from one wall of the casing 63. The construction is such that as the gear 30 rotates it will cause an electric current to be set up by the machine which will pass out through the wheels 68, the radial ribs 33' will simultaneously engage and pivot the L-shaped member 73 to oscillate the rods 70 and oscillate the wheels 68. The springs 78 will tend to draw the L-shaped member 73 back to a position in which it will be properly aligned with the radial ribs 33'.

Figures 9, 10:
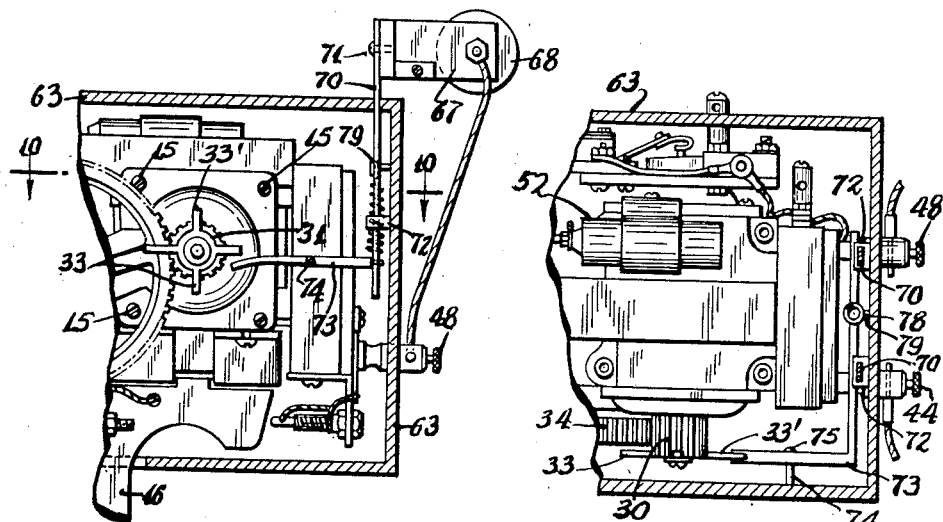
Fig. 9 is a vertical sectional view of Fig. 8.
Fig. 10 is a horizontal sectional view taken substantially on the line 10—10 of Fig. 9.
Figure 11:
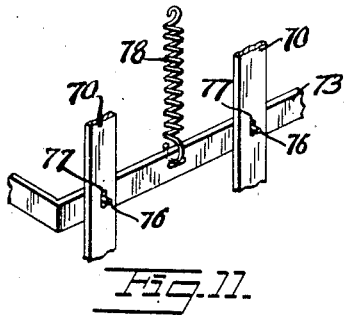
Fig. 11 is a partial perspective view of a portion of Fig. 9.

In Figs. 8 and 9 the metallic members 67 are shown attached to the rods 70 in a manner to project horizontally from the shocking machine. In Fig. 12 it will be noted that the members 67 are attached to the rods 70 in a manner to extend vertically from the shocking machine. With this construction it is possible to engage the wheels 68 against a portion of the body while rotating the handles 37 to set up the electric current which will pass into the body through the wheels 68. Simultaneously the wheels will be oscillated with relation to the surface they are engaging to massage the portion of the body at the same time.

In Fig. 13 the electric cord 64 is shown provided at one end with the metallic end members 65 while the other end is connected to a plug 80 from which a pair of adjacent projecting members 81 extend. These projecting members 81 are constructed of metallic conducting material and are connected together by means of insulation material 82. It is thus possible to grip the plug which is constructed of insulation material and move the members 81 across a portion of the body for massaging and simultaneously causing an electric shock to enter the body.

In Fig. 14 the electric cord 64 is again shown having one of its ends connected to a handle of non-conducting material which has a metallic core 84 projected from one end of the handle 83 and rotatively supporting a wheel 85. The construction is such that the free end of the wire 64 is adapted to be gripped in one hand while the handle 83 is gripped in the other and used to engage the wheel 85 against a portion of the body over which it is adapted to be rolled in a manner to simultaneously massage the surface against which it is engaged and permit an electric shock to pass through the body.

In Fig. 15 the electric cord 64 is again illustrated. In this figure the free ends of the electric cord 65 are connected with a pair of hand cuffs 86 which are adapted to be engaged about a person's wrists to cause the electric current to enter the body through the wrists.

In Figs. 16 and 17 the electric cord 64 has its ends passed through a body of insulation material 87 upon which a pair of adjacent metallic plates 88 are mounted. These plates 88 are mounted one adjacent the other in a substantially aligned plane and are attached to the ends of the electric cord 64 by means of wires 89 attached to binding posts 90 to which the ends of the electric cord 64 are attached.

In Figs. 18 and 19 the electric cord 64 has its free end connected to a plug 91 into which a pair of electric leads 92 extend. These leads 92 are connected together by means of insulation material 93 supporting metallic members 94ª electrically connected to the leads 92. The metallic members 94 rotatively carry wheels 95 which are adapted to be engaged against a portion of one's body and rolled thereover for simultaneously massaging the surface and causing an electric current to enter the body therethrough.

It is to be understood that any one or several of the articles shown in Figs. 13–19 may be used individually or selectively with either of the shocking machines shown in Figs. 1 and 8.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A magnetoelectric shocking machine having a casing enclosing a rotative armature and transmission system for rotating said armature to deliver a potential across a pair of terminals, shock delivering members mounted exteriorly of said casing and having portions extended into said casing and slidably supported therein and connected with said terminals, and means operable by said transmission for reciprocating said shock delivering members to produce a massaging effect and including a pivotally mounted arm having one end connected to said shock members and its other end engaged by a member fixedly mounted on and rotatable with said transmission.

2. A magnetoelectric shocking machine having a casing enclosing a rotative armature and transmission system for rotating said armature to deliver a potential across a pair of terminals, shock delivering members mounted exteriorly of said casing and having portions extended into said casing and slidably supported therein and connected with said terminals, and means operable by said transmission for reciprocating said shock delivering members to produce a massaging effect, comprising an arm pivotally mounted intermediate of its ends within said casing on one wall thereof, said arm having one of its ends connected to said shock delivering members, a member mounted concentric on a shaft of said transmission system and having radial ribs engaging the free end of said arm to oscillate said arm as said shaft turns, and resilient means urging said arm in a position in which its free end will be engaged by said ribs.

3. A magnetoelectric shocking machine having a casing enclosing a rotative armature and transmission system for rotating said armature to deliver a potential across a pair of terminals, shock delivering members disposed exteriorly of said casing and having portions extended into said casing and slidably supported therein and connected with said terminals, an arm pivotally mounted intermediate of its ends on an interior wall of said casing and having an end connected to said members, a spring connected to said arm for urging it into a position in which said members will be retracted and said arm will have its free end disposed adjacent said transmission system, and means mounted on a shaft of said transmission system for striking the free end of said arm as said transmission system is turned for reciprocating said arm against the action of said spring to similarly reciprocate said shock members.

JAMES TROTTA.